C. L. SHEPHARD.
PISTON PACKING RING.
APPLICATION FILED AUG. 3, 1914.

1,175,383.  Patented Mar. 14, 1916.

Witnesses:
Geo. R. Ledrow
Jesse Park

Inventor,
Clarence L. Shephard.
By Bakewell & Cornwell Attys.

UNITED STATES PATENT OFFICE.

CLARENCE L. SHEPHARD, OF ST. LOUIS, MISSOURI, ASSIGNOR TO BUFFUM TOOL COMPANY, OF LOUISIANA, MISSOURI, A CORPORATION OF MISSOURI.

PISTON PACKING-RING.

1,175,383.  Specification of Letters Patent.  Patented Mar. 14, 1916.

Application filed August 3, 1914. Serial No. 854,819.

*To all whom it may concern:*

Be it known that I, CLARENCE L. SHEPHARD, a citizen of the United States, residing at St. Louis, Missouri, have invented a certain new and useful Improvement in Piston Packing-Rings, of which the following is a full, clear, and exact description, such as will enable others skilled in the art to which it appertains to make and use the same.

This invention relates to piston packing rings, and has for its main object to provide a piston ring that is constructed in such a manner that it effectually prevents leakage between the cylinder wall and the piston with which the ring is used.

Another object is to provide a piston ring that is composed of a plurality of separate annular sections which coöperate with each other so that different sections are automatically brought into intimate contact with the wall of the cylinder at certain times during the stroke of the piston.

Other objects and desirable features of my invention will be hereinafter pointed out.

Figure 1:
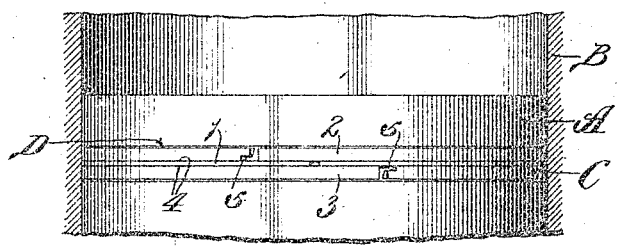
Figure 2:
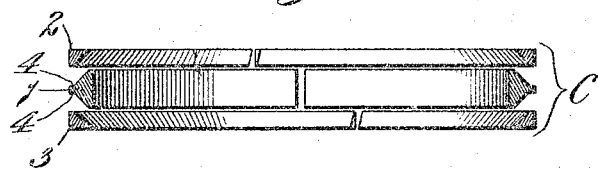
Figure 3:
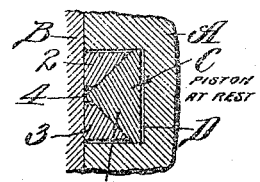
Figure 4:
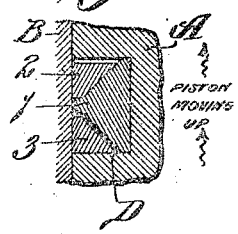
Figure 5:
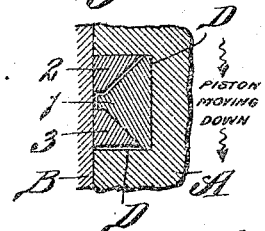
Figure 6:
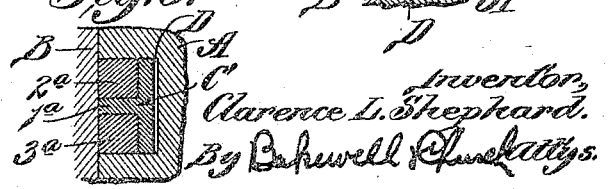

Figure 1 of the drawings is a vertical sectional view of a portion of an engine cylinder, showing the piston in elevation and equipped with a packing ring constructed in accordance with my invention. Fig. 2 is a transverse sectional view of the packing ring, the parts comprising same being slightly separated. Fig. 3 is a detail sectional view illustrating the approximate position assumed by the several parts of the ring when the piston with which it is used is at rest. Figs. 4 and 5 are detail views similar to Fig. 3, illustrating the approximate position assumed by the several parts of the ring when the piston is moving upwardly and downwardly, respectively; and Fig. 6 is a detail view similar to Fig. 3, illustrating a slightly modified form of my invention.

Briefly described, my invention consists in forming a piston packing ring of a plurality of separate ring-shaped expansible members, the central or inner member being provided with means that coöperates with means on the other members, so as to force one or the other of the same into engagement with the cylinder wall at certain times during the stroke of the piston.

Referring to Figs. 1 to 5 of the drawings, which illustrate the preferred form of my invention, A designates a piston that is reciprocatingly mounted in a cylinder B, and C designates my improved packing ring that is arranged in an annular groove D formed in the piston A. The ring C is composed of a central or body portion 1 and upper and lower portions 2 and 3, respectively, all of said portions being preferably in the form of split expansion rings. The width of the central portion 1 at the inner face thereof is approximately equal to the width of the groove D, and said portion is provided with a lateral extension or flange that is beveled or inclined on its upper and lower faces, said beveled surfaces extending to and terminating at a point adjacent to the center of the outer face thereof, where a pair of horizontally disposed annular shoulders or abutments 4 is formed. The portions 2 and 3 of the packing ring are alike and interchangeable, each of said portions being provided with a flat horizontally disposed surface that coöperates with one of the horizontal walls of the groove D, a flat vertical surface that coöperates with the wall of the cylinder and a beveled or inclined surface that coöperates with one of the beveled surfaces on the portion 1, so that when the ring C is assembled, the relationship of the several portions is as shown in Fig. 3.

By referring to Fig. 3 it will be noted that the groove D in the piston A is slightly deeper than the portion 1 of the ring, and that the combined widths of the outer faces of the upper and lower portions 2 and 3 and the outer exposed face of the portion 1 is slightly less than the width of the groove D. When the piston with which the packing ring is used is at rest, the several parts of said ring lie approximately as shown in Fig. 3, wherein the inner face of the portion 1 is spaced away slightly from the vertical wall of the groove D and the horizontal faces of the upper and lower portions 2 and 3 are out of contact with the horizontal walls of said groove and the horizontal shoulders or abutments 4 on the ring 1. When the piston moves upwardly, the portions of the ring assume the position shown in Fig. 4, wherein the friction on the side wall of the cylinder B has forced the portion 2 downwardly against the portion 1, the coöperating beveled surfaces on said portions causing the portion 1 to be forced inwardly, so as to snugly engage the vertical wall of the groove D, and the portion 2 to be forced outwardly against the cylinder wall, the abutment or shoulder 4 limiting the lateral movement of said portions, so that the portion 2 cannot bind or press too tightly against the cylinder wall. The portion 1 being forced inwardly has, at this time, no influence over the portion 3, said portion 3 being spaced away from the portion 1 and engaging the cylinder wall comparatively lightly, due to its own expansion only. It will thus be seen that on the upstroke of the piston the portion 2 is positively forced outwardly into intimate engagement with the wall of the cylinder, thus absolutely preventing the escape of gas between the cylinder wall and piston, and the portion 1 is positively forced inwardly against the vertical wall of the groove D, so as to prevent the escape of gas around the ring C. The portion 3 of the ring exerts sufficient pressure on the cylinder wall to prevent any leakage of gas that may pass through the open space or joint of the ring 2, the joints or open spaces of all of said portions being preferably staggered, as shown in Fig. 1. Any suitable means may be employed for preventing the portions of the ring from working around on each other, so as to line up the open spaces formed therein, the means herein shown consisting of pins 5 in the body portion 1 that coöperate with slots formed in the members 2 and 3.

On the downward stroke of the piston, the several parts of the ring assume the position shown in Fig. 4, wherein the portion 3 is positively forced outwardly against the cylinder wall and the portion 1 inwardly against the vertical wall of the groove D.

From the foregoing it will be seen that on the up and down strokes of the piston, respectively, the portions 2 and 3 of the ring C are successively brought into intimate contact with the cylinder wall, and the portion 1 is forced inwardly against the vertical wall of the groove D, thus effectually preventing any leakage, either past or around the ring C.

In Fig. 6 I have illustrated a slightly modified form of my invention, wherein the portion 1ª of the ring C' is approximately T-shaped in cross section, the top and bottom faces of the laterally projecting portion thereof being flat instead of beveled, and the portions 2ª and 3ª rectangular in cross section.

From the foregoing it will be seen that I have produced a piston packing ring that is more efficient than the rings now in general use, that can be easily applied to or removed from the piston, owing to the fact that all the parts comprising same are in the form of split expansion rings, and which comprises few simple parts that can be manufactured cheaply.

Having thus described my invention, what I claim is:

A piston packing ring that is adapted to be slipped over the head of the piston of an internal combustion engine, comprising a central inherently expansible split ring that is composed of an inner portion that is approximately of the same width as the groove in which the ring is arranged, an outer portion of less width than said groove and having faces that lie parallel to the side walls of said groove, the outer edge of said outer portion normally engaging the wall of the cylinder with which the ring coöperates, and an intermediate portion that joins said inner and outer portions, the walls of said intermediate portion converging from said inner portion to said outer portion; an inherently expansible split ring arranged on each side of said central ring and provided with an inclined surface that coöperates with the intermediate portion of said central ring, and a surface that coöperates with and lies parallel to the walls of the outer portion of said central ring; and means on said central ring that coöperates with means on each of the other rings for preventing circumferential movement of any of said rings with respect to the others.

In testimony whereof I hereunto affix my signature in the presence of two witnesses, this thirty-first day of July, 1914.

CLARENCE L. SHEPHARD.

Witnesses:
WELLS L. CHURCH,
GEORGE BAKEWELL.